(12) United States Patent
Prince

(10) Patent No.: US 10,577,519 B2
(45) Date of Patent: Mar. 3, 2020

(54) HYDROPHOBIC TREATMENT FOR SKI AND METHOD

(71) Applicant: Derek Prince, Torquay (GB)

(72) Inventor: Derek Prince, Torquay (GB)

(73) Assignee: Nanowaxxx Limited, Wells (GB)

( * ) Notice: Subject to any disclaimer, the term of this patent is extended or adjusted under 35 U.S.C. 154(b) by 64 days.

(21) Appl. No.: 15/512,476

(22) PCT Filed: Sep. 16, 2015

(86) PCT No.: PCT/GB2015/052680
§ 371 (c)(1),
(2) Date: Mar. 17, 2017

(87) PCT Pub. No.: WO2016/042323
PCT Pub. Date: Mar. 24, 2016

(65) Prior Publication Data
US 2017/0198167 A1    Jul. 13, 2017

(30) Foreign Application Priority Data

Sep. 17, 2014 (GB) .................................. 1416413.1

(51) Int. Cl.
*C09G 3/00* (2006.01)
*A63C 5/056* (2006.01)

(52) U.S. Cl.
CPC ................ *C09G 3/00* (2013.01); *A63C 5/056* (2013.01)

(58) Field of Classification Search
None
See application file for complete search history.

(56) References Cited

U.S. PATENT DOCUMENTS

| 3,770,633 A * | 11/1973 | Holley et al. ............ C09G 3/00 508/138 |
| 4,272,572 A * | 6/1981 | Lyng .................... A63C 5/0428 428/112 |
| 4,540,195 A * | 9/1985 | Smith-Johannsen ........................ A63C 5/056 156/224 |
| 6,743,467 B1 * | 6/2004 | Jones .................... C09D 5/1675 427/180 |

(Continued)

FOREIGN PATENT DOCUMENTS

| CN | 1378581 A | 11/2002 |
| EP | 0303055 A1 | 2/1989 |

(Continued)

OTHER PUBLICATIONS

Towards faster skis, Thesis R C Coupe the University of Sheffield Oct. 2013.*
Felix Breitschadel, Nora Haaland, Nuria Espallargas; A Tribological Study of UHMWPE Ski Base Treated with Nano Ski Wax and its Effects and Benefits on Performance; published Jul. 2014; 6 pages; www.elsevier.com/locate/procedia; www.sciencedirect.com; XP028875451.

(Continued)

*Primary Examiner* — Kenneth J Stachel
(74) *Attorney, Agent, or Firm* — Hard IP LLC

(57) ABSTRACT

A ski including a base layer made from permeable material, wherein the base layer is treated with a composition comprising at least one chemical component to confer hydrophobicity with a water contact angle of greater than 120° to the base layer and a carrier fluid for the chemical component, the composition permeating the material of the base layer and modified the material to be hydrophobic throughout its volume.

19 Claims, 1 Drawing Sheet

(56) References Cited

U.S. PATENT DOCUMENTS

| | | | | |
|---|---|---|---|---|
| 2010/0285710 | A1* | 11/2010 | Reick | C09G 3/00 441/68 |
| 2011/0159299 | A1* | 6/2011 | Linforf | B05D 1/36 428/447 |
| 2011/0287203 | A1 | 11/2011 | Victor et al. | |
| 2015/0329756 | A1* | 11/2015 | Carlson | C09K 3/18 428/484.1 |

FOREIGN PATENT DOCUMENTS

| | | |
|---|---|---|
| EP | 0444752 A1 | 9/1991 |
| WO | WO03/033608 | 4/2003 |
| WO | WO09/059037 | 5/2009 |

OTHER PUBLICATIONS

James, David Ed—Islam AK M Sadrul et al.; Preface; The 2014 Conference of the International Sports Engineering Association; published Jul. 2014; 2 pages; www.elsevier.com/locate/procedia; www.sciencedirect.com; XP028875404.

International Search Report and Written Opinion received in PCT/GB2015/052680 dated Nov. 10, 2015; 10 pages, ISR& Written Opinion.

Great Britain Office action for Application No. GB1416413.1, dated Nov. 21, 2014, 4 pages.

The First Office Action for Chinese Application No. CN201580061997.4, dated Aug. 7, 2018, 16 pages.

* cited by examiner

HYDROPHOBIC TREATMENT FOR SKI AND METHOD

This application is a national phase filing under 35 U.S.C. 371 of international patent application no. PCT/GB2015/052680 filed on Sep. 16, 2015 which claims priority to application no. GB 1416413.1 filed on Sep. 17, 2014, the contents of both which are incorporated herein by reference in their entirety.

The present invention relates to a hydrophobic treatment composition for a ski and to a method for applying it thereto.

For the purposes of this specification, a 'ski' is to be interpreted as including each individual ski of a pair of skis, a snowboard, and sliding parts of sledges, toboggans, bobsleighs and the like.

BACKGROUND TO THE INVENTION

Ski bases are usually produced using ultra-high molecular weight polyethylene (UHMWPE) derived from high density polyethylene (HDPE), either by extruding or sintering the material. Typically, any ethylene plastic with a molecular weight above 3.1 million is suitable for a ski or snowboard base. Other materials used for ski bases include polytetrafluoroethylene (PTFE, commonly known as Teflon™) and wood.

Ethylene-based skis, amongst others, have relatively low surface energies which reduces the tendency for water molecules to associate with the surface of the base, making them relatively hydrophobic. Hydrophobicity is defined in terms of the contact angle ($\theta$) between a water droplet and a material surface. For a water droplet on a material surface, the contact angle is the angle between that material surface and a tangent of the droplet surface at the point where it meets the material surface. Superhydrophobic surfaces can be defined as having contact angles at or above 150°. Known artificial superhydrophobic materials are superhydrophobic by virtue of a thin surface coating designed for that purpose, but damage to or erosion of the coating causes a significant loss of the desired superhydrophobic properties.

Waxing the surface of a ski increases its hydrophobicity (increasing the contact angle of a water droplet from around 90° to around 110-120°), somewhat improving the 'glide' of the ski or snowboard over snow by reducing frictional forces between the hydrophobic base and the snow. This typically involves optimising the thickness of the thin film of water generated between the snow and the hydrophobic base, as well as balancing 'wet' and 'dry' friction. The greater the porosity of the base, the greater the improvement in 'glide' (up to a point) when wax is applied to the base as compared with the performance of a similar but non-waxed base. Some bases also have additives such as fluorocarbon powder or graphite, which further improve their 'glide'.

Extruded bases are produced by melting the polyethylene, extruding it into a sheet and then cutting out the desired base shape. Such bases have properties that confer modest gliding interactions with snow if left unwaxed. This is due to its smooth, less porous surface, which is inexpensive to produce and requires minimal maintenance. By contrast, sintered bases are relatively expensive to produce, as the polyethylene must be ground into a powder, subjected to heat and pressure, and then sliced into shape, generating a different grain structure within the base relative to extruded bases. Sintered bases are more durable than extruded bases, and are also known to be faster on snow, when waxed. This is due to their inherently higher porosity which accepts wax more readily than extruded bases. However, they also require the application of wax to maximise their potential performance relative to extruded bases.

Waxes for skis are worn away during use (especially due to friction with ice) and are deposited onto the snow. This means the wax must be re-applied regularly. Such waxes often contain a wide variety of chemicals, the exact formulation of each being concealed as trade secrets by each manufacturer. However, certain compounds known to be in such waxes include fluorocarbons which can have a damaging effect on the environment. This applies especially where contaminated snow melts (particularly in spring, for non-permanent resorts) and carries the chemicals into the water table and other sources of water. It is also possible for the chemicals to become airborne if associated with water during normal evaporative processes. Given the known toxicity of chemicals in such waxes, local wildlife and plants can be adversely affected, damaging the local ecology. People who live in the area can also be similarly affected.

It is an object of the present invention to reduce or substantially obviate the aforementioned problems.

STATEMENT OF INVENTION

According to a first aspect of the present invention, there is provided a ski including a base layer made from permeable material, wherein the base layer is treated with a composition comprising at least one chemical component to confer hydrophobicity to the base layer such that it has a water contact angle of greater than 120°, a carrier fluid for the chemical component, the composition permeating the material of the base layer and modifying the material so as to be hydrophobic throughout its volume.

The treated ski is highly advantageous as it is has a hydrophobic base layer, which minimises friction with the surface it glides or slides over, thereby increasing the performance of the ski. Notably, waxing a ski surface only achieves a maximum water contact angle of around 120°, so a contact angle greater than this will lead to reduced interactions with water, and hence better 'glide' performance. If any damage occurs to the base layer during use (including gradual erosion of the base layer) or when preparing a ski for use (by grinding, for example), the newly-exposed portion of the base layer also has hydrophobic properties with a water contact angle of greater than 120°, meaning that ski performance is not detrimentally affected.

The carrier fluid ensures that the chemical component (which imparts hydrophobic properties) fully permeates the base layer when applied. The composition permeates the base layer of the ski and bonds to the surfaces of individual grains within the base layer, coating the outer surface of each grain (even where the grain is located away from the external ski surface). The base layer is therefore modified to be hydrophobic throughout its volume; that is to say, exposing a previously unexposed portion of the base layer simply alters the physical shape of the base layer, rather than substantially changing the hydrophobicity of the portion contacting the snow.

The at least one chemical component may confer hydrophobicity to the base layer such that it has a water contact angle of 125° or greater to the base layer. Preferably, the at least one chemical component may confer superhydrophobicity to the base layer such that it has a water contact angle of 150° or greater.

A contact angle of at least 125° reduces the extent to which water associates with the ski. Having a superhydrophobic ski is more advantageous as compared to a hydrophobic ski, as the water contact angle is much larger, reducing the degree to which water interacts with the surface. This increases the performance of the ski as drag and other frictional losses are minimised, so that the speed of the ski over the snow is maximised. Notably, waxing a ski surface only achieves a maximum water contact angle of around 120°, so a contact angle of 150° or greater will lead to markedly reduced interactions with water. Unlike a simple superhydrophobic coating, which will lose superhydrophobicity if any part becomes damaged, the base layer is modified to be superhydrophobic throughout its volume so that altering the ski surface through preparation or use does not remove the superhydrophobic properties.

As before, this is achieved because the composition permeates the ski and bonds to the surfaces of individual grains within the base layer, coating the outer surface of each grain (even where the grain is located away from the external ski surface). This prevents water from associating with any portion of the ski surface even when damaged, whereas a thin film of water would preferentially associate with non-superhydrophobic portions and contribute to significant performance loss through increased drag and friction.

The chemical component may include at least one polymer having functional groups. Preferably, each polymer may have at least one repeating unit. More preferably, the functional groups may include functionalised silicon.

Using a polymer with functional groups is advantageous because these groups can be tailored to improve the 'glide' of the ski by conferring hydrophobicity to it, whilst the main polymer provides a support structure for clusters of these groups. Having functionalised silicon in the functional groups can confer hydrophobicity, and provides for the possibility of forming a silicon-based bonded network which confers hydrophobicity to the bulk of the material treated.

The at least one polymer may be an alternating copolymer, which may be generated from at least hydrogenated bisphenol A and epichlorohydrin.

One example of an appropriate pair of compounds which can copolymerise are hydrogenated bisphenol A and epichlorohydrin, and thereby provide reactive terminal epoxides on the alternating copolymer chain as it grows. Reacting these terminal epoxides with other chemicals can stop chain growth and allows the polymer chain to be functionalised with groups which can confer hydrophobicity. By applying the chemicals to the surface of the ski, they permeate the layer and react together, forming a three-dimensional network throughout the layer. This strengthens the entire layer, and confers hydrophobicity to the whole structure.

The functional groups of the at least one polymer may be generated from a curative reagent. Preferably, the curative reagent includes an amine group. More preferably, the curative reagent may include functionalised silicon. Yet more preferably, the curative reagent may be 3-aminopropyltriethoxysilane.

The curative reagent is advantageous as it cures and hardens the resulting polymer, whilst incorporating silicate groups into the polymer. This ensures that it does not erode quickly or easily, as it is hard-wearing. Using 3-aminopropyltriethoxysilane as the curative reagent is advantageous as its primary amine group can react with several terminal epoxide groups on nearby polymer strands, maximising the extent of the covalent network created, whilst the silicate group is able to relocate flexibly, being at the end of a propyl chain.

The functional groups of the at least one polymer may be cross-linked by a cross-linking reagent. Preferably, the cross-linking reagent may be silicate-based. More preferably, the cross-linking reagent may be tetraethylsilicate.

Cross-linking the silicate functional groups ensures that a silicate network extends throughout the layer, rather than having individual silicate groups which would improve 'glide' to a lesser extent. Tetraethylsilicate is an effective cross-linking reagent for this purpose, ensuring that the layer is not just coated but is fully permeated by the silicate network, conferring hydrophobic properties to the bulk material.

The carrier fluid may include at least one solvent. The solvent may include one or more of the following: ethanol, butanone, 1-methoxy-2-propanol.

Using a solvent can temporarily dissolve the chemical component and allow it to permeate the base layer completely, ensuring that the hydrophobic properties are conferred throughout the volume of the base layer once the solvent has dried. Furthermore, the solvent may also accelerate the curing process of the polymer, particularly where ethanol and/or 1-methoxy-2-propanol are used.

Alternatively, the chemical component may include at least one type of polysiloxane. Preferably, the chemical component may include two types of polysiloxane. More preferably, the or each type of polysiloxane may have aminated functional groups. Yet more preferably, each aminated functional group may include two amine groups. Even more preferably, each aminated functional group may include a primary amine.

One appropriate family of chemicals are the polysiloxanes, which can readily confer hydrophobicity. Incorporating a polysiloxane into the ski is advantageous because it has low surface energy (or surface tension), which is a key property in allowing it to improve the 'glide' of the ski by conferring hydrophobicity. They are also inherently flexible about their Si—O—Si bonds, ensuring that individual polysiloxanes do not become damaged easily during flexing of the ski. A combination of polysiloxanes can be used to tailor the degree of 'glide' conferred. Having aminated functional groups, particularly doubly aminated groups including a primary amine, allows the polymer to bind to the ski. They also improve the water solubility of the polysiloxane prior to application of the composition, but not once the polysiloxane has been applied to the ski.

The or each type of polysiloxane may be a poly[3-((2-aminoethyl)amino)propyl]methyl(dimethyl)siloxane. Preferably, the or each type of polysiloxane may be one of the following: methoxy-terminated, hydroxy-terminated.

Poly[3-((2-aminoethyl)amino)propyl]methyl(dimethyl) siloxanes are one example of a suitable group of polysiloxanes. These have relatively high permeability relative to typical polysiloxanes, improving the rate at which it permeates the ski. Using either methoxy- or hydroxyl-terminated polysiloxanes (or both) ensures that the polysiloxane network is particularly flexible and does not become damaged during flexing of the ski. It also confers some resistance to damage caused by incident ultraviolet (UV) light, ensuring that the polysiloxane network does not degrade easily due to increased UV exposure at altitude.

In this alternative, the carrier fluid may include at least one solvent. The solvent may include one or both of the following: diethylene glycol monobutyl ether, ethylene glycol monohexyl ether.

Using a solvent can temporarily dissolve the chemical component and allow it to permeate the base layer completely, ensuring that the hydrophobic properties are conferred throughout the volume of the base layer once the solvent has dried. Both diethylene glycol monobutyl ether and ethylene glycol monohexyl ether are water soluble, and each can improve the water solubility of the relevant polysiloxane(s) prior to application of the composition.

The permeable material may be at least in part any ethylene plastic. Preferably, the permeable material may be at least in part ultra-high molecular weight polyethylene (UHMWPE). Alternatively, the permeable material may be at least in part wooden.

Skis are commonly made from ethylene plastic, often being UHMWPE. The composition is able to permeate UHMWPE and confer hydrophobic properties to virtually the entire material.

The ski may include a top layer which is treated with the composition.

It is advantageous to also treat the top layer of a ski as it will reduce drag in scenarios such as off-piste skiing, where deep snow may overlie the ski. It can also reduce the accumulation of snow on the top layer of the ski.

According to a second aspect of the invention, there is provided a method for treating the material of a surface of a ski with a composition comprising the steps of: (a) cleaning the surface to be treated, (b) applying the composition to the surface, and (c) allowing the composition to permeate the surface; the composition including at least one chemical component to confer hydrophobicity to the material such that it has a water contact angle of greater than 120° or greater, and a carrier fluid for the chemical component; wherein the composition modifies the material so as to be hydrophobic throughout its volume.

To ensure that the application of the composition results in relatively uniform hydrophobicity throughout the ski, the surface is cleaned before applying the composition. This means that few contaminants remain to react with composition or otherwise destabilise the resulting hydrophobic structure of the ski material. The composition is applied to the surface of the ski and allowed to permeate therethrough, ensuring that hydrophobic properties (having a water contact angle of greater than 120°) are conferred to the entire permeable portion of the ski. Should any damage to the external surface occur in use thereafter, the newly-exposed ski surface is also hydrophobic with a water contact angle of greater than 120° and performance does not deteriorate noticeably.

The at least one chemical component may confer hydrophobicity to the material such that it has a water contact angle of 125° or greater. Preferably, the at least one chemical component in the method may confer superhydrophobicity to the material such that it has a water contact angle of 150° or greater.

A contact angle of at least 125° reduces the extent to which water associates with the ski to a greater degree than wax can. Having a superhydrophobic ski is more advantageous compared to a hydrophobic ski, as the water contact angle is much larger, reducing the degree to which water interacts with the surface. This increases the performance of the ski as drag and other frictional losses are minimised, so that the speed of the ski over the snow is maximised. Notably, waxing a ski surface only achieves a maximum water contact angle of around 120°, so a contact angle of 150° or greater will lead to markedly reduced interactions with water. Unlike a simple superhydrophobic coating, which loses superhydrophobicity if any part becomes damaged, the base layer is modified to be superhydrophobic throughout its volume so that altering the ski surface through preparation or use does not remove the superhydrophobic properties.

The method may additionally comprise the further steps of: (d) allowing the composition to cure, and (e) removing excess composition from the treated surface.

The composition is allowed to cure before using the ski so that the layer is not introduced to water (which may be in the form of snow) prior to any reactions completing, else the water may affect the integrity of the hydrophobic modification to the base layer. Removing excess composition from the ski slightly reduces the ski weight and improves its aesthetic appearance.

Cleaning the surface to be treated in step (a) may include at least one of the following: removing any wax from the surface, steaming the surface, wiping the surface with alcohol.

These steps each ensure that the ski surface is not contaminated by wax or dirt, and so the composition will not be impeded from permeating the material (or otherwise undergo adverse or unintended reactions).

Applying the composition to the surface in step (b) may include at least one of the following: spraying the composition onto the surface, physically applying the composition to and spreading it across the surface.

Spray application is quick and gives relatively even coverage, and is most applicable where the composition dries relatively quickly. Physically applying the composition to a ski and spreading it ensures full coverage and is most applicable where the composition dries relatively slowly.

Excess composition may be ground away from the treated surface in step (d).

Grinding is beneficial to the ski surface after treatment as it creates a smooth finish, further minimising any potential drag and friction during use. This is possible because the composition permeates through the entire material of the surface it is applied to, and so the destructive removal of material from the surface does not detrimentally affect the hydrophobic properties of the ski.

The surface to be treated may be one or more of: the base layer, the top layer.

Treating the base layer of the ski is inherently advantageous as that surface will be almost always be in contact with snow and/or ice during use. It is advantageous to also treat the top layer of a ski as it will reduce drag in scenarios such as off-piste skiing, where deep snow may overlie the ski. It can also reduce the accumulation of snow on the top layer of the ski.

BRIEF DESCRIPTION OF THE DRAWINGS

For a better understanding of the present invention, and to show more clearly how it may be carried into effect, reference will now be made by way of example only to the accompanying drawings, in which.

DESCRIPTION OF PREFERRED EMBODIMENT

Figure 1:
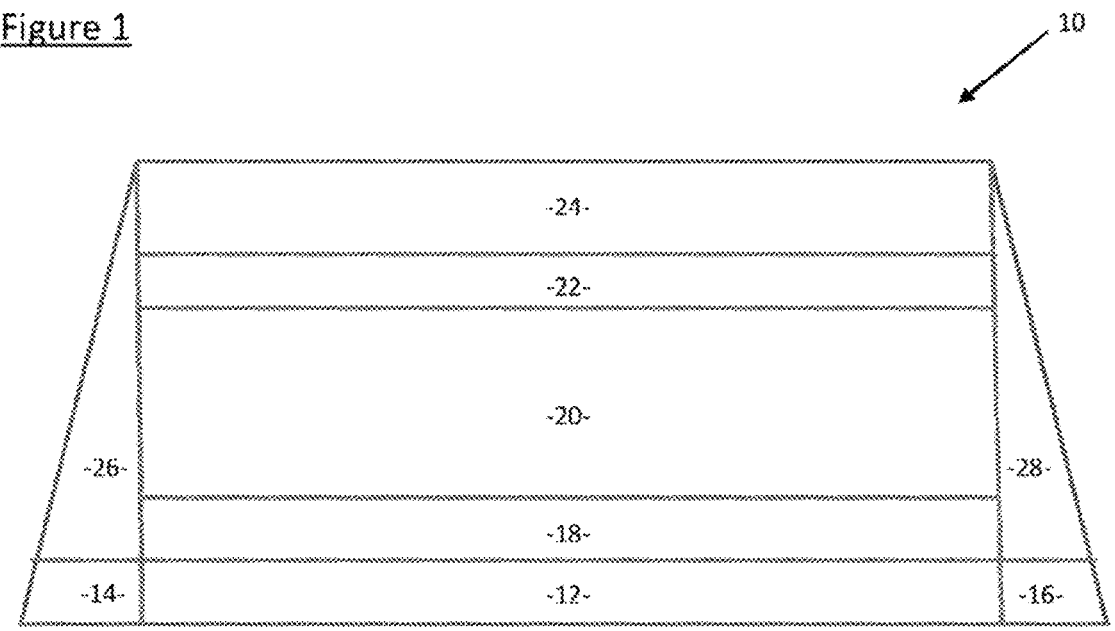
FIG. 1 shows a cross-sectional schematic of a first embodiment of a ski.

Referring firstly to FIG. 1, a first embodiment of a ski is indicated generally at 10. It shows the construction of a typical ski, with the base layer 12 used to glide over snow with its periphery being bounded by two hard edges 14, 16.

The base layer 12 is securely bound to the core layer 20 of the ski through a first intermediary bonding layer 18. The core layer 20 is further bound via a second intermediary bonding layer 22 to the top layer 24 of the ski. Sidewalls 26, 28 encompass the sides of the ski above the hard edges 14, 16 to protect the core layer 20 and bonding layers 18, 22 from degradation. The sidewalls 26, 28 in this embodiment taper slightly outwards towards the base layer 12 of the ski.

Each layer noted above may be comprised of several layers of material, to create a stronger laminate material, for example. This is particularly true for the core layer 20, where a combination of woods may be used, as may plastics or fibres of various sorts. The hard edges 14, 16 are often made of metal, such as steel, to aid the user in turning when gliding down a slope. When a composition is applied to the base layer 12 to modify it to be hydrophobic, the composition permeates through the base layer 12 completely, without adversely affecting the edges 14, 16, bonding layers 18, 22 or the core layer 20. This ensures that the performance of the base layer 12 is enhanced when gliding on a surface comprised of water, without affecting the structural integrity of the ski. As such, the flexibility and strength of the ski are not reduced relative to the pre-treatment version of the ski, and its other performance-related properties are not adversely affected either.

Figure 2:
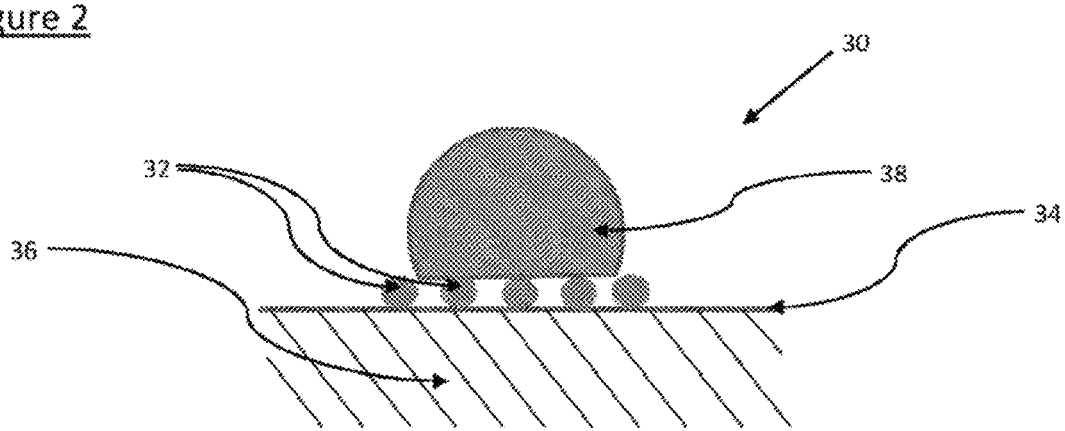
FIG. 2 shows an illustration of a surface and a water droplet on that surface, the surface having been treated with a first type of composition to make it hydrophobic.
Figure 3:
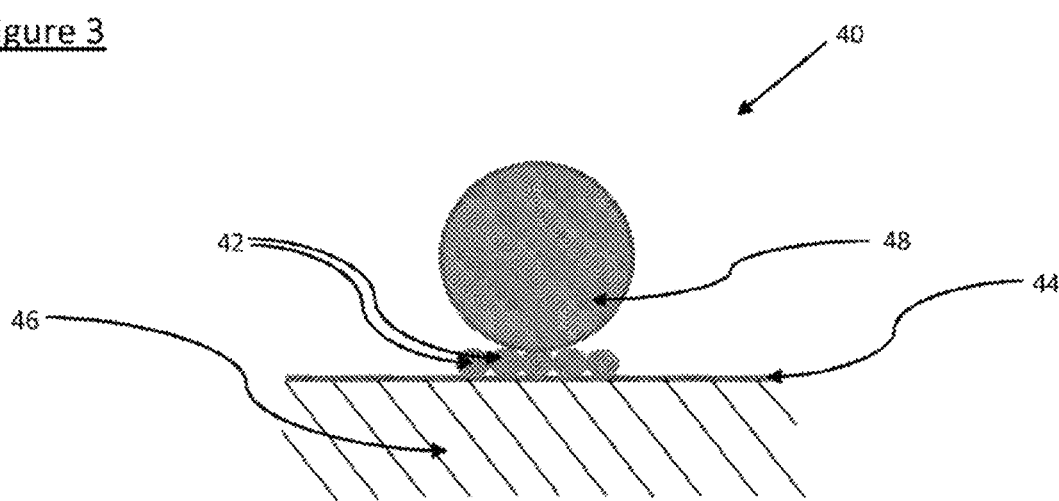
FIG. 3 shows an illustration of a surface and a water droplet on that surface, the surface having been treated with a second type of composition to make it superhydrophobic.

Referring now to FIGS. 2 and 3, the behaviour of a water droplet on surfaces modified to be hydrophobic (indicated at 30) and superhydrophobic (indicated at 40) is illustrated, each representing the base layer of a treated ski. Similar to the grains of a wooden ski, a ski base made from UHMWPE has microscopic defects in the overall structure of the material. These are formed as the material cools after being processed, generating equivalent grains of UHMWPE which solidify and meet imperfectly at grain boundaries. Grains may be microscopic or nanoscopic.

In the case of a ski treated with a composition to modify these grains to be hydrophobic, or superhydrophobic, the composition adheres to the surface of each grain, providing a nanostructure which is hydrophobic. The exact form of the nanostructure depends on the chemicals and composition used. The nanostructures attached to the surface of each grain in the base layer contribute to the reduced tendency for a water droplet to associate with each surface. The composition may provide for microstructures as well as nanostructures, depending on the grain size.

In FIG. 2, the distance between these nanostructures 32 is small, both on the exposed surface 34, that is the surface which is visible when observing the ski, and throughout the non-exposed material 36 of the surface, that is the material which is hidden beneath the visible surface. Therefore, a water droplet 38 will form a substantially hemispherical shape as, on balance, it is more energetically favourable for the droplet to maximise water-water molecular interactions than it is for it to maximise water-surface interactions.

In FIG. 3, the equivalent nanostructures 42 are closer together, both on the exposed surface 44, that is the surface which is visible when observing the ski, and throughout the non-exposed material 46 of the surface, that is the material which is hidden beneath the visible surface. This leads to a water droplet 48 forming a near-spherical shape, as it is much more energetically favourable for the droplet to maximise water-water molecular interactions than water-surface interactions. As the droplet is more spherical compared to FIG. 2, the angle of its surface tangent where the droplet meets the hydrophobic surface is larger, that is its water contact angle is larger. In FIG. 3, the angle is above 150° and the surface is classified as superhydrophobic, whilst in FIG. 2, the less pronounced angle, being above 90°, is classified as merely hydrophobic.

Consequently, it would be more energetically favourable for water to adhere more extensively to a waxed ski surface as compared to the present hydrophobic ski surfaces in FIG. 2 and FIG. 3, relative to internal cohesive forces between water molecules in the water droplet. This is because a fully waxed ski surface only achieves a maximum water contact angle of 120°. A waxed ski will experience comparatively greater drag and frictional losses due to its more extensive interactions. In contrast, a hydrophobic ski will have comparatively low losses due to these factors, because there are relatively fewer surface interactions to be overcome as the ski moves across the supporting surface (whether snowy, icy or watery, or a simulation of one of these).

As an exemplary embodiment only, a first type of composition to modify a ski to be hydrophobic may include several compounds which together with a mixture of solvents permeate the microstructure of the ski base to confer hydrophobicity, listed here as compounds (I-IV). One possible such embodiment might comprise compound (I) as hydrogenated bisphenol A and compound (II) as epichlorohydrin. These can be purchased together, listed as CAS: 30583-72-3. It might further comprise compound (III) (listed as CAS: 919-30-2) as 3-aminopropyltriethoxysilane, and compound (IV) (listed as CAS: 78-10-4) as tetraethylsilicate. The solvents used in this composition are ethanol, butanone and 1-methoxy-2-propanol. These together act as a carrier fluid and allow the compounds (I-IV) to permeate and infuse the ski material. The alcohols can act as accelerators in the reactions involved. The bulk of each solvent evaporates as the reaction proceeds. However, any appropriate solvent may be used.

The chemicals react together as the solvent evaporates, on application of the composition to a ski base. Each hydroxyl group on a molecule of compound (I) can substitute with the chlorine atom on a molecule of compound (II), or cause ring-opening of the epoxide in a molecule of compound (II). When compound (III) is present, the amine group can instead cause epoxide ring-opening in compound (II) at the terminal end of the polymer chain. The amine group can perform additional ring-openings with additional epoxides, subject to steric considerations, allowing the relatively short individual chains to form a three-dimensional network through the permeated material of the ski. These steps are commonly known as 'curing'. Furthermore, in the presence of compound (IV), the silicate groups of compound (III) can be cross-linked by condensation of ethanol from compound (IV) and the alcohol groups generated from epoxide ring-opening, forming a three-dimensional silicate network through the material of the ski it has permeated. This silicate network in particular confers hydrophobicity to the material, with cross-linking also occurring as the solvent evaporates.

When applied to a ski, the above composition confers hydrophobicity to the exposed surfaces as well as the bulk material, such that exposing a new surface of the treated portion of the ski, for example, through accidental damage such as a scratch, merely affects the physical shape of the ski, and not its hydrophobic properties. This is possible because the composition permeates the ski and bonds to the surfaces of individual grains within the base layer, coating the outer surface of each grain (even where the grain is located away from the external ski surface). This results in each coated grain having a predominantly silicate surface, conferring hydrophobicity. As such, any grains which are lost from the ski base due to damage or wear simply expose further grains with the same hydrophobic properties, allowing the ski to retain its hydrophobic properties. The composition can be said to become part of the material microstructure.

As the polymer forms a large cross-linked network, this composition is particularly hard-wearing, being very resistant to erosion or damage through friction as the ski is used to pass across the relevant supporting surface, whether snow, ice or water. It is therefore considered that the treatment is permanent relative to the useful lifetime of the ski. Although particularly resistant to being worn away from the ski, it takes time to modify a ski with the composition as it must permeate and set within the ski before use, as the presence of water, as snow, for example, would alter the chemical reactions occurring at the surface of the ski. In particular, it would quickly consume compound (II), and react with any epoxides in polymer chains, preventing the large cross-linked network from forming correctly.

The chemical components (compounds (I-IV)) of this composition are provided in proportionate amounts. A typical composition of this particular example could include between 5% and 20% by weight of compounds (I-IV), with the remainder being solvents; however, the composition is not limited to only these proportions of chemicals. The composition is typically applied manually to the base layer of a ski, after its surface has been cleaned by removing any wax. To ensure engrained wax is also removed, the ski is steamed with a hot iron and its surface wiped with alcohol to remove further contaminants. The chemicals are then mixed together and applied to the surface of the ski once homogenised, and allowed to permeate receiving surface. This step is preferably done in a dry environment, to prevent water from contaminating the composition.

The composition typically permeates the full depth of the base layer, which is generally of the order of 1.2 mm, curing to form the three-dimensional polymer network with cross-linked silicates. Once completely set, which may take up to around 36 hours in some cases, any excess is removed to smoothen the exposed surface, optimising it for use. Depending on temperature and other variables however, the composition may set more quickly, taking only a few minutes in some cases. In these cases, the composition has set but residual amounts of the solvents used may still be present, and the additional time to set is to allow these solvents to evaporate.

Removing the excess may be done using standard ski preparation techniques, as scraping or grinding the surface, for example, will not destroy the hydrophobic properties of the ski, given that the ski is not coated but permeated throughout by the composition. Any alterations to the contours of the ski surface during removal will merely expose a previously unexposed surface that is also hydrophobic. This method involves merely one example of a composition which can be used to modify a ski base to be hydrophobic in its entirety, and is not restricted to only the composition described.

In a further exemplary embodiment, a second type of composition to modify a ski to be hydrophobic includes different compounds and solvents. In this second type of composition, it is possible, for example, to use two types of functionalised polysiloxane to achieve hydrophobicity, which are referred to hereafter as compound (V). Of two such polysiloxanes, one is hydroxy-terminated (CAS: 75718-16-0) and one is methoxy-terminated (CAS: 102782-92-3), for the purposes of this embodiment. The solvents used for this composition are diethylene glycol monobutyl ether and ethylene glycol monohexyl ether. However, any appropriate solvent may be used.

The polysiloxane is able to permeate through the material microstructure of the ski it is applied to and again confers hydrophobicity to the bulk material of the ski, particularly the base layer. Although it does not form a large interconnected three-dimensional network as the first type of composition does, it can be applied much more quickly as it does not require time to set. It instead adheres through interactions of its aminated groups with the surface of each individual grain in the ski base.

In the second type of composition, the particular solvents used are water soluble, and as such they can be used to solvate the polysiloxanes in water too. This means that it can be formulated for use in a water-based spray, making for much faster application relative to the first composition. This composition is also considered to be permanent relative to the lifetime of the ski.

It still takes time for the composition to permeate the ski material, but it does not need additional time to then cure prior to use. To apply this composition, it is sprayed onto a clean ski surface, and allowed to permeate the material, drying in the process of doing so. It can still be applied and spread manually on the surface if needed, although it is better that the surface is clean prior to application in either case. Note that the composition is not envisaged as being restricted to the above solvents—this is merely one possible means of solvating the compounds in this composition.

Both compositions have the advantage that they can be used to treat a ski irrespective of whether the ski is brand new or has been used previously, if cleaned. On application of either composition to the snow-contacting areas of a ski, particularly the base layer, but the top layer may also be treated, the relevant portion of the ski becomes permanently modified and has hydrophobic properties thereafter, whether formed from wood or an ethylene plastic such as UHMWPE. The resultant ski has at least equivalent, but mainly superior, hydrophobicity as compared to an untreated but waxed ski, allowing the user to experience a similar or superior 'glide' in use. This enables the manufacturer-designed structure of the snow-contacting base portion to operate more efficiently. Each composition is also resistant to chemicals normally considered safe to use on UHMWPE without damaging it. The need for additional products traditionally used to improve 'glide', such as wax, is therefore completely eliminated.

Although not described in the particular embodiment above, it is envisaged that variations of compositions described herein will be suitable for treating and modifying skis to have water contact angles of greater than 120°, giving the skis hydrophobic properties throughout their volume, or to have water contact angles of 125° or greater, or even 150° or greater, giving the skis superhydrophobic properties throughout their volume. Other polymers with different functional groups and constituent monomers are envisaged to confer hydrophobicity in combination with suitable solvent(s), whether using a polymer with a single repeating monomer, a copolymer with two types of substituent monomers or any other kind of polymer. The polymer chain length may be one, several or many monomers, as many different variations of composition are envisaged for the purposes of modifying skis as explained previously. No restrictions are considered to have been placed on the chemical structure or elemental make-up of the aforementioned substituent monomers. Similarly, no restrictions are considered to have been placed on the chemical structure or elemental make-up of functional groups on such polymers. It is readily apparent that any number of compounds within the general group of polymers could be used to achieve hydrophobicity in the manner described, and the above embodiments do not limit the invention in any way.

The embodiments described above are provided by way of example only, and various changes and modifications will be apparent to persons skilled in the art without departing from the scope of the present invention as defined by the appended claims.

The invention claimed is:

1. A ski including a base layer made from permeable material, wherein the base layer is treated with a composition comprising:
    at least one chemical component to confer hydrophobicity to the base layer such that it has a water contact angle of greater than 90°, and
    a carrier fluid for carrying the at least one chemical component into the base layer,
    the composition permeating the permeable material of the base layer and modifying the permeable material so that the permeable material is hydrophobic throughout its volume, in which the at least one chemical component includes at least one polymer having functional groups and at least one repeating unit, and in which the at least one polymer is an alternating copolymer generated from at least hydrogenated bisphenol A and epichlorohydrin.

2. The ski of claim 1, wherein the carrier fluid includes at least one solvent is selected from: ethanol, butanone, or 1-methoxy-2-propanol.

3. The ski of claim 1, in which the functional groups are generated from a curative reagent including an amine group.

4. The ski of claim 3, in which the curative reagent includes functionalised silicon.

5. The ski of claim 3, in which the curative reagent is 3-aminopropyltriethoxysilane.

6. The ski of claim 1, in which the functional groups are cross-linked by a silicate-based cross-linking reagent.

7. The ski of claim 6, in which the silicate-based cross-linking reagent is tetraethyl silicate.

8. A ski including a base layer made from permeable material which comprises at least in part at least one of ultra-high molecular weight polyethylene or ethylene plastic, wherein the base layer is treated with a composition comprising:
    at least one chemical component to confer hydrophobicity to the base layer such that it has a water contact angle of greater than 90°, in which the at least one chemical component includes two polysiloxanes having respective aminated functional groups, each respective aminated functional group including two respective amine groups and in which each of the two polysiloxanes is a poly[3-((2-aminoethyl)amino)propyl]methyl(dimethyl)siloxane, and
    a carrier fluid for carrying the at least one chemical component into the base layer, the carrier fluid including at least one solvent,
    the composition permeating the permeable material of the base layer and modifying the permeable material so that the permeable material is hydrophobic throughout its volume.

9. The ski of claim 8, in which at least one of the two respective amine groups includes a primary amine.

10. The ski of claim 8, in which one of the two polysiloxanes is methoxy-terminated, and the other of the two polysiloxanes is hydroxy-terminated.

11. The ski of claim 8, wherein the at least one solvent is selected from: diethylene glycol monobutyl ether, or ethylene glycol monohexyl ether.

12. A ski including a base layer made from permeable material which comprises at least in part at least one of ultra-high molecular weight polyethylene or ethylene plastic, wherein the base layer is treated with a composition comprising:
    at least one chemical component to confer hydrophobicity to the base layer such that it has a water contact angle of greater than 90°, in which the at least one chemical component includes at least one polysiloxane, in which the at least one polysiloxane has aminated functional groups which include first and second amine groups, at least one of the first and second amine groups including a primary amine, the at least one polysiloxane being a poly[3-((2-aminoethyl)amino)propyl]methyl(dimethyl)siloxane, and
    a carrier fluid for carrying the at least one chemical component into the base layer, the carrier fluid including at least one solvent,
    the composition permeating the permeable material of the base layer and modifying the permeable material so that the permeable material is hydrophobic throughout its volume.

13. The ski of claim 12, wherein the at least one solvent is selected from: diethylene glycol monobutyl ether, or ethylene glycol monohexyl ether.

14. The ski of claim 12, in which the at least one chemical component includes another polysiloxane having aminated functional groups, each aminated functional group including two amine groups.

15. The ski of claim 14, in which the another polysiloxane is a poly[3-((2-aminoethyl)amino)propyl]methyl(dimethyl)siloxane.

16. The ski of claim 14, in which one of the at least one polysiloxane or the another polysiloxane is methoxy-terminated, and the other of the at least one polysiloxane or the another polysiloxane is hydroxy-terminated.

17. A method for treating a base layer made from permeable material of a surface of a ski with a composition comprising the steps of:
    (a) cleaning the surface to be treated,
    (b) applying the composition to the surface, and
    (c) allowing the composition to permeate the surface;
    the composition including at least one chemical component to confer hydrophobicity to the base layer such that it has a water contact angle of greater than 90° the at least one chemical component including at least one polymer having at least one repeating unit and functional groups, and a carrier fluid for carrying the at least one chemical component into the base layer, the carrier fluid including at least one solvent, and in which the at least one polymer is an alternating copolymer generated from at least hydrogenated bisphenol A and epichlorohydrin, wherein the composition permeates the permeable material and modifies the permeable material of the base layer so that the permeable material is hydrophobic throughout its volume.

18. The method of claim 17, further comprising the steps of:
    (d) allowing the composition to cure, and
    (e) removing excess composition from the surface to which the composition is applied.

19. The method of claim 17, in which cleaning the surface to be treated in step (a) includes at least one of the following:

removing any wax from the surface, steaming the surface, or wiping the surface with alcohol.

\* \* \* \* \*